Aug. 5, 1958  B. A. KNAUTH  2,845,798
VORTEX FLOW THROTTLING DEVICE
Filed Sept. 13, 1956  2 Sheets-Sheet 1
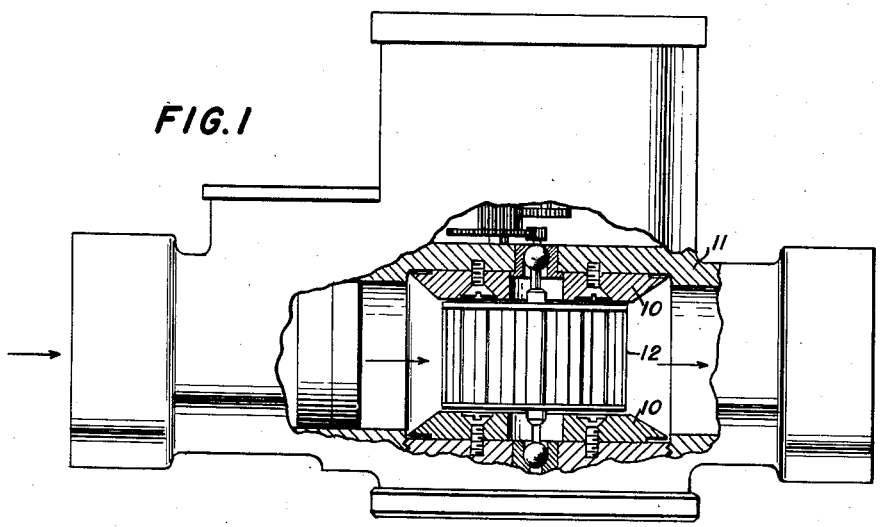
FIG. 1
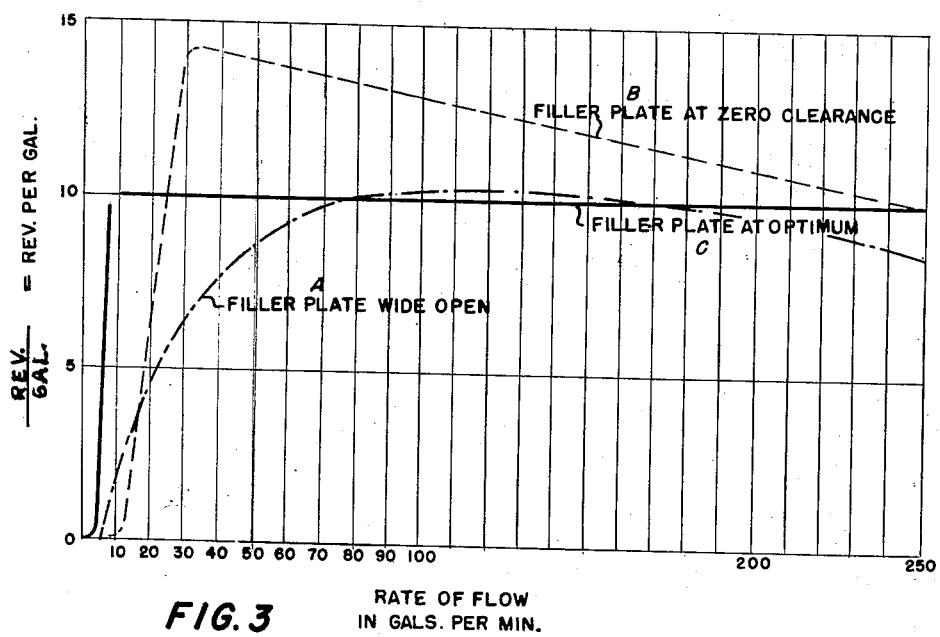
FIG. 3  RATE OF FLOW IN GALS. PER MIN.
INVENTOR
*BERTHOLD A. KNAUTH*
BY *Andros and Smith*
ATTORNEYS

2,845,798
VORTEX FLOW THROTTLING DEVICE

Berthold A. Knauth, High Falls, N. Y.

Application September 13, 1956, Serial No. 609,708

5 Claims. (Cl. 73—230)

This invention relates to a vortex-velocity type flowmeter, and more specifically to a filler plate for such a meter.

Such a flowmeter preferably comprises a vortex cage, or wheel, placed in a conduit such that the axis of flow through the conduit is substantially tangential to one side of the wheel, and is a continuation in part of my co-pending application, Serial No. 532,187, filed September 2, 1955. The flow of fluid past the wheel causes it to rotate and, within limits, the faster the flow through the conduit, the faster the wheel will turn. It has been found, however, that the rate of flow plotted against the rate of revolutions of the wheel is not linear. It is an object of this invention therefore to provide means to make the rate of rotation of the wheel into a linear function of the rate of flow in the conduit.

It is a further object of the present invention to provide a means such that the vortex diameter of the flowmeter may be maintained constant at all rates of flow.

It is a still further object of this invention to provide adjustable means to regulate the volume of shunt flow of fluid axially into the vortex of such a flowmeter.

Other and further objects and advantages of the present invention will appear from the following description taken with the accompanying drawings in which:

Figure 1 is a plan view, partly broken away, of a vortex-velocity type flowmeter in which a device embodying the present invention is installed.

Figure 3 is a graph in which revolutions per gallon are plotted against the rate of flow in gallons per minute under different conditions.

Figure 2:
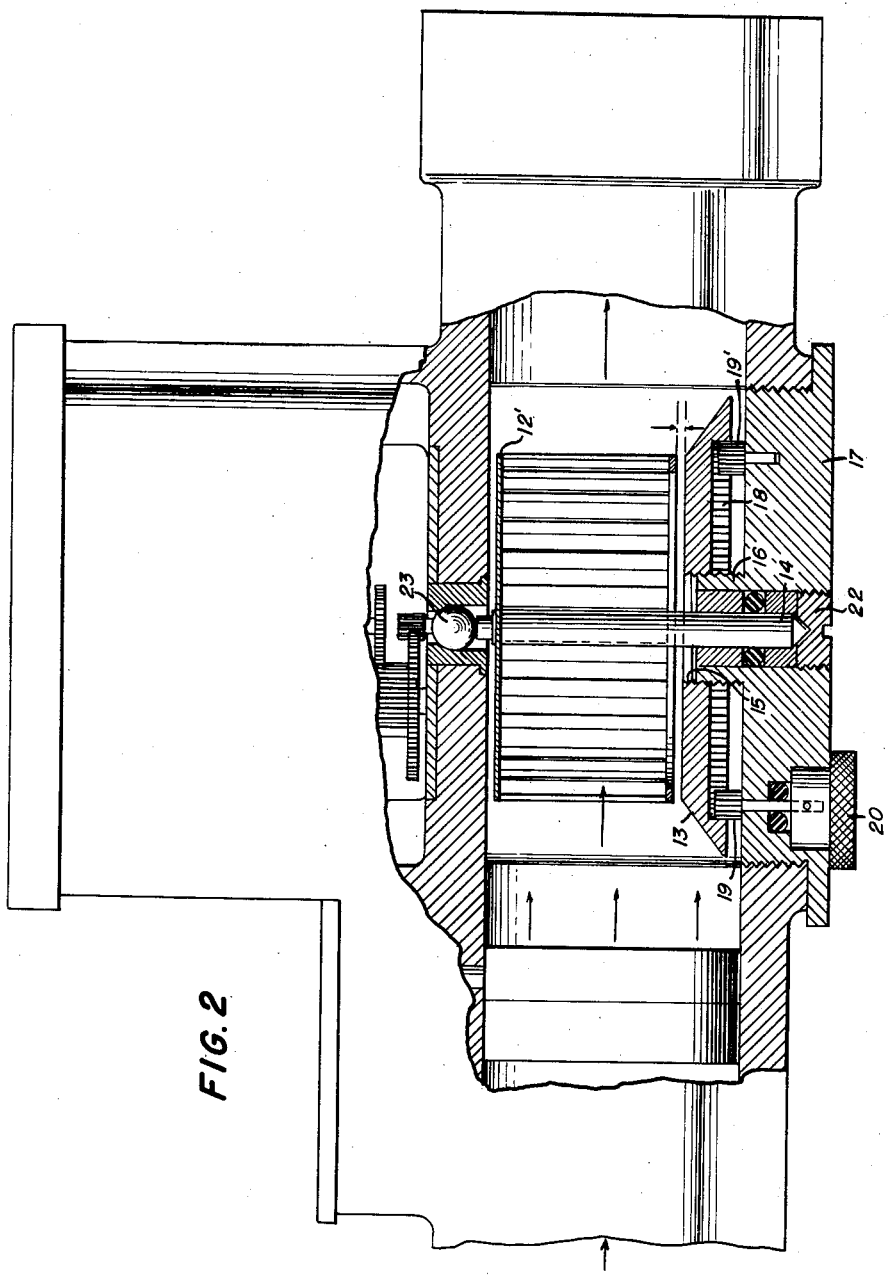
Figure 2 is an enlarged view, similar to Figure 1, showing a modified device of the present invention.

In flowmeters of the vortex-velocity type, which depend upon fluid engagement between the flow being measured and the vortex fluid, a primary requisite is the maintenance of a constant vortex diameter at all rates of flow. In other words, the objective is to maintain the vortex, which may be likened unto a wheel, at a constant diameter so that it will turn in direct proportion to the speed of the fluid, which may be considered the equivalent of the road on which the wheel is running.

The volume per minute of fluid flowing through the conduit may be determined by multiplying the area of the conduit times the feet per minute of flow in the conduit. If, then, the vortex, or wheel, rolls without slip on the flowing fluid, or road, there will be a linear relationship between vortex revolution and volume of flow.

In my previously filed application, the instrument described therein has a useful range of approximately 6 to 1, that is, for instance, from 50 gallons per minute to 300 gallons per minute. The wheel of this earlier application has one end closed and the other end open, and no structure is disclosed therein for controlling the volume of shunt flow of the fluid axially into vortex.

Referring to Figure 3, curve A is the curve based on data taken from a meter in which the filler plate is wide open, similar to that shown in the earlier application. Curve B is the curve where both ends of the wheel are closed off as though the filler plate had no clearance. Curve C shows the linear relationship between vortex revolutions and volume of flow when the filler plate, or plates, are adjusted at optimum position.

Where the meter is to be used under constant conditions to measure the flow of a fluid, the flowmeter may be provided as shown in Figure 1 with filler plates 10 mounted rigidly in the casing 11 of the meter. In this case, however, the exact clearance between wheel 12 and filler plates 10 must be accurately determined, once and for all, prior to installation of the meter; but if, subsequently, it is desired to use this meter under different conditions, or with different fluids, it will be necessary to provide different filler plates 10.

Figure 2 shows a modified form of adjustable filler plate at 13. In this case it is shown with a cage, or wheel, 12' which has one closed side and therefore does not have a filler plate against that side. The adjustable filler plate 13 in Figure 2 could, of course, be used in the device of Figure 1 in place of one of the filler plates 10. In order to provide the necessary volume of shunt flow of fluid axially into the vortex of a vortex-velocity type flowmeter, the device of Figure 2 provides a wheel, or vortex cage 12' which is closed by an end plate on one end and rotates on axis 14.

Shunt flow into the vortex is typically through the open space between filler plate 13 and the edge of the vortex cage 12'. Adjustable filler plate 13 is threaded in a central opening at 15, that is mounted on screw threaded boss 16, which is a portion of the flowmeter conduit wall 17. Filler plate 13 bears internal ring gear 18 which is in engagement with a pinion gear 19 which may be actuated by external means 20 drivingly connected to pinion 19 by a connecting shaft extending through conduit wall 17. Idler gears 19' may be provided if desired to give additional support to filler plate 13.

Since the vortex cage 12' is fixed in the conduit by its bearings 22 and 23, the space between the vortex cage 12' and adjustable filler plate 13 can be readily varied by rotating the filler plate 13 on threaded boss 16 by means of pinion 19 driven by knurled finger wheel 20.

With the use of the adjustable filler plate 13 for shunt flow control as shown in Figure 1, and a correct setting of this filler plate with respect to the vortex cage 12, the performance of the instrument will follow curve C of Figure 3, and the rangeability of the instrument will be increased to approximately 25 to 1, or from 10 to 250 gallons per minute for the particular flowmeter under consideration.

The open area along the periphery of the vortex cage must be such, it has been found, that shunt flow may never fall below the peripheral discharge rate of the vortex cage.

While various changes may be made in the details of construction, it will be understood that such changes shall be within the spirit and scope of the present invention, as defined by the appended claims.

Having described my invention what I claim as new and desire to secure by Letters Patent is:

1. In a fluid flowmeter of the vortex-velocity type, a vortex cage mounted in a rigid casing and having substantial peripheral clearance, said vortex cage having at least one open end, whereby shunt flow of fluid into said cage is established, and a filler plate mounted in said casing adjacent said open end and spaced therefrom to control the shunt flow of fluid into the interior of said cage.

2. The device of claim 1, in which said filler plate is mounted so as to be axially adjustable toward and away from said vortex cage, whereby the space between said vortex cage and said filler plate may be adjusted to its optimum dimension.

3. The device of claim 2, in which said filler plate is mounted on a screw threaded element coaxial with said vortex cage so that upon rotation it can be advanced or retracted coaxially on said threads toward and away from said open end of said vortex cage.

4. The device of claim 3, in which means extending through the wall of said casing are provided, whereby said filler plate can be rotated on said coaxial screw threaded element to adjust the space between said filler plate and the vortex cage.

5. In a vortex-velocity flowmeter, a casing, a vortex cage having an open end, an enlargement in said casing to house said vortex cage, said enlargement having spaced parallel sides, said vortex cage being mounted on an axis of rotation normal to said parallel sides, a threaded boss concentric with said axis on the parallel side adjacent said open end of the vortex cage, a filler plate threadedly mounted on said threaded boss, an annular ring of gear teeth formed on said filler plate, a spur gear mounted on said parallel side in such position as to mesh with said ring of gear teeth, and an actuating shaft for said spur gear extending through said casing, whereby said filler plate may be rotated on said threaded boss by rotation of said actuating shaft to adjust the axial position of said filler plate with respect to said vortex cage.

References Cited in the file of this patent

UNITED STATES PATENTS

| | | |
|---|---|---|
| 1,958,223 | Yates | May 8, 1934 |
| 2,037,278 | Siber | Apr. 14, 1936 |
| 2,285,976 | Huitson | June 9, 1942 |